United States Patent Office 3,753,974
Patented Aug. 21, 1973

3,753,974
NERIIFOLIN DERIVATIVES
Fritz Kaiser, Lampertheim, Hessen, Wolfgang Schaumann, Heidelberg, Kurt Stach, Mannheim-Waldhof, and Wolfgang Voigtlander, Viernheim, Hessen, Germany, assignors to Boehringer Mannheim GmbH, Mannheim, Germany
No Drawing. Filed Dec. 1, 1970, Ser. No. 94,210
Claims priority, application Germany, Dec. 19, 1969, P 19 63 597.3
Int. Cl. C07c 173/00
U.S. Cl. 260—210.5       4 Claims

ABSTRACT OF THE DISCLOSURE

Neriifolin ethers, optionally acylated, of the formula

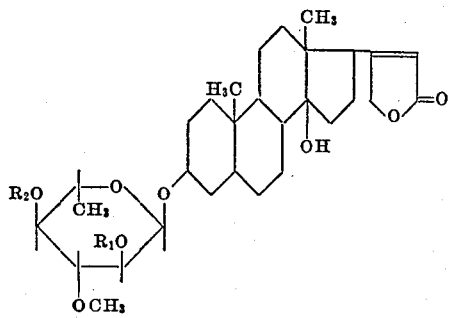

wherein one of the substituents $R_1$ and $R_2$ is a lower alkyl or alkoxyalkyl radical and the other is a hydrogen atom or a lower acyl radical.

These neriifolin derivatives are highly effective therapeutic agents and are suitable for oral administration in the treatment of cardiac insufficiency.

---

The present invention is concerned with new derivatives of neriifolin and with the preparation thereof and is also concerned with pharmaceutical compositions containing these new derivatives of neriifolin.

The new derivatives of neriifolin according to the present invention are compounds of the general formula:

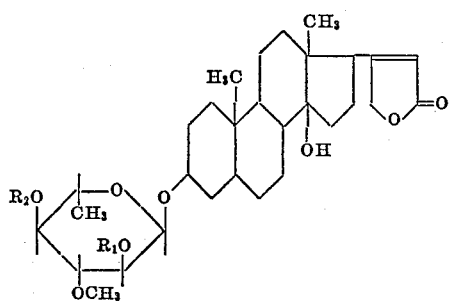

wherein one of the substituents $R_1$ and $R_2$ is a lower alkyl or alkoxyalkyl radical and the other is a hydrogen atom or a lower acyl radical.

We have found that the new derivatives of neriifolin according to the present invention possess a surprisingly high resorption and are, therefore, outstandingly suitable for oral administration for the therapy of cardiac insufficiencies.

The new derivatives of neriifolin according to the present invention can be prepared by alkylating neriifolin in known manner and, if desired, subsequetly O-acylating the product obtained.

The alkylation can be carried out by reaction with appropriate alkylation agents, especially with alkyl halides, dialkyl sulfates or diazoalkanes.

The O-acylation can be carried out with the use of all acylation agents which are conventionally employed in sugar chemistry, for example, acid anhydrides, acid imidazolides, acid chlorides, possibly with the addition of a tertiary amine, or with the free acids. The acyl radical is preferably that of a lower fatty acid, especially acetic acid.

The present invention is also concerned with pharmaceutical compositions containing at least one of the new derivatives of neriifolin according to the present invention, in admixture with a solid or liquid pharmaceutical diluent or carrier.

The following examples are given for the purpose of illustrating the present invention, all liquid ratios being by volume unless otherwise stated:

EXAMPLE 1

Neriifolin monomethyl ether 1 g. neriifolin is dissolved in 8 ml. dimethyl formamide, diluted with 8 ml. toluene and, after the addition of 0.58 g. barium hydroxide and 0.2 g. barium oxide, mixed at ambient temperature and with stirring, with a solution of 0.82 ml. dimethyl sulfate in 8 ml. toluene added dropwise in the course of 60 minutes. After stirring the reaction mixture for 4 hours at ambient temperature, it is diluted with 150 ml. chloroform, filtered off with suction, washed with chloroform, the filtrate mixed with 3 ml. pyridine and then evaporated in a vacuum. The residue is taken up in chloroform, shaken out with water and the chloroform phase, after drying over anhydrous sodium sulfate, is evaporated in a vacuum. The residue is subjected to a multiplicative partition with the phase mixture carbon tetrachloride-ethyl acetate-methanol-water 3:1:2:2. The evaporated organic phase is subjected to a further multiplicative partition with the phase mixture carbon tetrachloride-ethyl acetate-methanol-water (9:1:6.4). The aqueous phase is shaken out with chloroform, evaporated and the residue crystallized from chloroform-ether. There are obtained 280 mg. neriifolin monomethyl ether, with a melting point of 194–198° C.

EXAMPLE 2

Monoacetyl-neriifolin monomethyl ether 500 mg. neriifolin monomethyl ether, prepared in the manner described in Example 1, are dissolved in 5 ml. pyridine, mixed with 2.5 ml. acetic anhydride and left to stand at ambient temperature for 24 hours. Thereafter, the reaction mixture is diluted with water and shaken out with chloroform. The chloroform phase is washed with 2 N sulfuric acid and water, dried over anhydrous sodium sulfate and evaporated in a vacuum. After crystallization of the residue from chloroform-ether-petroleum ether, there are obtained 390 mg. monoacetyl-neriifolin monomethyl ether, with a melting point of 103–107° C.

EXAMPLE 3

Neriifolin mono-(ethoxymethyl) ether 1 g. neriifolin is dissolved in 10 ml. dimethyl formamide and 10 ml. dimethyl-aniline, mixed with 1.5 g. ethyl chloromethyl ether and warmed to 40° C. for 20 hours. The reaction mixture is then diluted with 300 ml. water and extracted successively first with petroleum ether and several times with chloroform. The chloroform extracts are evaporated in a vacuum and fractionated with petroleum ether, benzene and chloroform-methanol (1:1) over 100 g. aluminum oxide. The residue obtained by the evaporation of the chloroform-methanol (1:1) fraction is then fractionated over silica gel with benzene-ethyl acetate. The fractions containing 40% ethyl acetate are evaporated and the residue crystallized from chloroform-petroleum ether. There are obtained 280 mg. neriifolin mono-(ethoxymethyl) ether, with a melting point of 88–91° C.

The compounds of this invention are useful in the preparation of medicinal agents because of their cardiopharmacodynamic actions.

Usually the neriifolin ethers of the invention are administered orally, for instance in the form of tablets or pills. The new compounds can also be administered parenterally, for instance, by intravenous injection. For this purpose, they are employed in the form of injectable solutions in water or isotonic salt solutions.

The neriifolin ethers according to the present invention are preferably not used as such as undiluted form but are diluted with suitable diluting agents as they are conventionally used as pharmaceutical carriers. Such dilution allows better and more economical use to be made thereof.

For making tablets, pills and other solid forms for medication, uniform dispersion of the active compound throughout the carrier is required. Such a fine and uniform dispersion is achieved for instance by intimately mixing and milling the neriifolin ethers according to the present invention with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills and other compressed forms, are the commonly used diluting agents, such as cornstarch, dextrose, lactose, sugar and the like. For making tablets and other compressed medication forms, binders such as pectins, gelatin, gum arabic, methylcellulose, yeast extract, agar, tragacanth, and lubricants such as magnesium stearate, calcium stearate, steric acid, talc and the like are used.

The amount of neriifolin ether present in such preparations may, of course, vary. It is necessary that the active ingredient be contained therein in such an amount that a suitable dosage will be ensured. Ordinarily the preparations should not contain less than about 0.1 mg. of the active neriifolin ether. The preferred amount in orally administered preparations such as tablets, pills and the like, it between about 0.2 mg. and 1.0 mg. per day.

The doses to be administered vary according to the type of action desired, i.e., whether said action is to be digitalization or maintenance. It is, of course, understood that the physician will determine the proper amounts to be given to a patient depending upon the symptoms to be alleviated and the patient's condition and that the doses given above are by no means limiting the new neriifolin ethers to such dosages.

Neriifolin is a heart glycoside which is quite effective when administered intravenously. The enteral effectiveness, however, is appreciably poorer, i.e. it is only incompletely resorbed.

In clinical trials as well as in animal experiments, the resorption quota is defined as the ratio of the effective doses in enteral and intravenous application. The incomplete resorption of the neriifolin can be demonstrated even more clearly with guinea pigs than with humans.

*Test Procedure.*—Guinea pigs were used which had been subjected to urethane anesthesia. A canula was fixedly inserted into the animals' duodenum above the bile duct juncture. The test compounds were intraduodenally injected in the amounts set forth in the table which follows. In each case the test compound was given in 10 ml./kg. of an aqueous solution containing 1% methylcellulose and 5% dimethylacetamide. The animals' EKG was observed on an oscilloscope and it was determined at what exact time the first ventricular extrasystoles occurred. If, for a period of 4 seconds, no EKG could be read, it was considered that cardiac arrest had occurred.

The test compounds were also administered intravenously by continuous infusion, the same procedures were followed and the results recorded.

The following table shows the results:

| Substance | LD, mg./kg. | | Resorption quota, percent |
|---|---|---|---|
| | I.d | I.v. | |
| Neriifolin | 1.8 | 0.9 | 50 |
| Neriifolin monomethyl ether | 2.2 | 2.0 | 91 |
| Monoacetyl-neriifolin monomethylether | 3.3 | 2.5 | 76 |
| Neriifolin mono-(ethoxymethyl) ether | 1.8 | 1.8 | 100 |

As can be seen from the table, the new neriifolin derivatives are less effective intravenously than the unsubstituted glycoside; however, their relative enteral effectiveness is appreciably higher, i.e. they are much better resorbed.

It will be appreciated that the instant specification and examples are set forth by way of illustration and not limitation and that various modifications and changes may be made without departing from the spirit and scope of the present invention.

What is claimed is:

1. Neriifolin derivatives of the general formula:

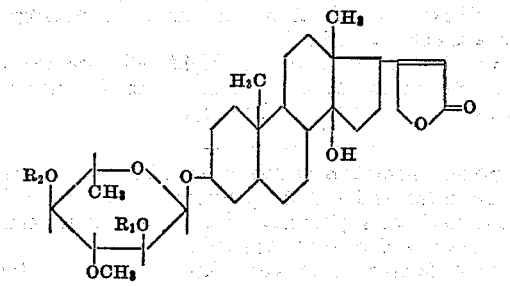

wherein one of the substituents $R_1$ and $R_2$ is a lower alkyl or lower alkoxy-lower alkyl radical and the other is a hydrogen atom or an acetyl radical.

2. Neriifolin derivative according to claim 1 wherein such derivative is neriifolin monomethyl ether.

3. Neriifolin derivative according to claim 1 wherein such derivative is monoacetyl-neriifolin monomethyl ether.

4. Neriifolin derivative according to claim 1 wherein such derivative is neriifolin mono-(ethoxymethyl) ether.

References Cited

UNITED STATES PATENTS 3,458,628  7/1969  Kaiser et al. _____ 260—210.5

LEWIS GOTTS, Primary Examiner

J. R. BROWN, Assistant Examiner

U.S. Cl. X.R.

424—182

UNITED STATES PATENT OFFICE
CERTIFICATE OF CORRECTION

Patent No. 3,753,974     Dated August 21, 1973

Inventor(s) Fritz Kaiser et al

It is certified that error appears in the above-identified patent and that said Letters Patent are hereby corrected as shown below:

Col. 3, line 39, change "steric" to --stearic--.

Signed and sealed this 6th day of August 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,753,974      Dated August 21, 1973

Inventor(s) Fritz Kaiser, et al

It is certified that error appears in the above-identified patent and that said Letters Patent are hereby corrected as shown below:

The term of this patent subsequent to August 21, 1990, has been disclaimed.

Signed and Sealed this

Twenty-seventh Day of July 1976

[SEAL]

Attest:

RUTH C. MASON      C. MARSHALL DANN
*Attesting Officer*      *Commissioner of Patents and Trademarks*